3,703,390
CAPACITOR ENCAPSULANT AND METHOD OF FORMING

Roland T. Girard, Scotia, and George A. Rice, Schenectady, N.Y., assignors to General Electric Company
No Drawing. Continuation of abandoned application Ser. No. 811,589, Mar. 28, 1969. This application Apr. 21, 1971, Ser. No. 136,265
Int. Cl. C03c 3/08, 3/04, 5/00
U.S. Cl. 106—54                                              2 Claims

ABSTRACT OF THE DISCLOSURE

A glass encapsulant for thick film capacitors capable of withstanding crazing when thermally cycled between 240° C. and −60° C. is composed of at least 45% by weight refractory metal oxides characterized by melting points above 1700° C. and between 1–4% by weight of high fluxing oxides of metals selected from the group consisting of sodium, potassium, lead and mixtures thereof. Preferably, the refractory metal oxides comprise a mixture of alumina, zirconia and silicon dioxide with alumina and zirconia cumulatively forming at least 25% by weight of the refractory metal oxides.

---

This application is a continuation of application, Ser. No. 811,589 filed Mar. 28, 1969, now abandoned.

This invention relates to a glass encapsulant for thick film capacitors and to the method of forming such glass encapsulant. In a more particular aspect, this invention relates to a glass encapsulant composed of at least 45% by weight refractory metal oxides and a low weight percent high fluxing oxides. The encapsulant is particularly adapted for screen printing atop thick film capacitors and is capable of withstanding temperature cycling between 240° C. and −60° C. without crazing.

Because spacial and electrical considerations favor the fabrication of integrated circuitry in a flat plane, thick film screen printed capacitors can be advantageously employed in the formation of circuitry having superior high frequency electrical characteristics. The screening technique and the materials employed for forming the capacitors however generally produce a highly porous dielectric making the electrical characteristics of the capacitor extremely sensitive to variations in ambient humidity. Organic sealants generally are not suitable as encapsulants for screened capacitors not only because the sealants characteristically are not completely impervious to moisture but also because many sealants are chemically incompatible with some of the underlying circuit components. Although commercially available glass encapsulants are impervious to moisture, the differing expansion coefficients of the capacitor elements, i.e. the diverse coefficients of expansion exhibited by the substrate, dielectric and electrodes, tend to effect a crazing in the commercially available glass sealants when cycled over a temperature range in excess of 200° C.

It is therefore an object of this invention to provide a novel glass encapsulant for thick film screened capacitors.

It is also an object of this invention to provide a glass encapsulant capable of being applied by a thick film screening process.

It is a further object of this invention to provide a glass encapsulant for a thick film capacitor capable of withstanding temperature cycling over a wide temperature range.

It is a still further object of this invention to provide a method of forming a strong glass encapsulant for thick film screen capacitors.

These and other objects of this invention are achieved in a glass encapsulant characterized by refractory metal oxides having melting points above 1700° C., high fluxing agents for the low temperature dissolution of the refractory compounds and flux modifiiers for reducing the thermal coefficient of expansion of the glass encapsulant by a glass composition containing at least 45% by weight of the refractory metal oxides and between 1–4% by weight of high fluxing oxides of metals selected from the group consisting of sodium, potassium, lead and mixtures thereof. Preferably the refractory metal oxides comprise a mixture of alumina, zirconia and silicon dioxide forming between 45–70% by weight of the encapsulant glass and the high fluxing agents compirse a mixture of sodium oxide and potassium oxide forming between 1–4% of the encapsulant glass. In forming the glass encapsulant, the ingredients are smelted above 1400° C. and ground to a dimension suitable for screen printing upon a capacitor by conventional techniques.

In general, the refractory metal oxides employed in the glass encapsulant are characterized by a melting point above 1700° C. and generally comprise oxides, such as alumina, zirconia and silicon dioxide, which oxides characteristically are very insoluble and impart a high chemical stability and a high melting point to the glass encapsulant. Preferably the weight percent of the refractory metal oxides in the encapsulant is high, e.g. above 45% by weight of the glass encapsulant, to impart a hardness to the encapsulant and the refractory metal oxides preferably are in an amount to reduce the thermal coefficient of expansion of the encapsulant below the thermal coefficient of expansion of the substrate upon which the capacitor is formed. Because the alumina and zirconia concentrations in the encapsulant effect crazing considerably, these materials desirably should comprise between 15 and 25% by weight of the glass encapsulant with the silicon dioxide being present in substantially larger amounts, e.g. at least 25% and preferably approximately 39% by weight of the glass encapsulant.

Resistance to crazing requires that some alumina, silicon dioxide and zirconia be present in the encapsulant. The exact proportion of each of the refractory metal oxides, however, can be varied, e.g. an increase in the zircoian content can be compensated by a decrease in the alumina content of the glass encapsulant. Alumina and zirconia however cumulatively should form a minimum of 25% by weight of the refractory metal oxides in the glass encapsulant and preferably form between 40 and 60% by weight of the refractory metal oxides.

To increase the solubility of the refractory metal oxides during smelting at temperatures below 1400° C., high fluxing oxides of a metal selected from the group consisting of sodium, potassium, lead and mixtures thereof are incorporated into the glass encapsulant, e.g. preferably as carbonates which decompose to the metal oxides during smelting in the formation of the glass encapsulant. Because the properties produced by lead oxide in the glass encapsulant are not as desirable as those obtained by either sodium oxide or potassium oxide, the encapsulant desirably is maintained substantially lead free and a combination of sodium oxide and potassium oxide in a total weight percentage less than 4% by weight of the entire glass encapsulant is employed to increase the solubility of the refractory metal oxides at temperatures exceeding 1400° C. Desirably these high fluxing oxides are present in concentrations between 1 and 4% by weight of the encapsulant because of the tendency of alkali fluxing agents to raise the thermal coefficient of expansion of the glass encapsulant to a value in excess of the thermal coefficient of expansion of the substrate resulting in a crazing of the material upon temperature cycling. Similarly, sodium oxide and potassium oxide are characterized by poor electrical properties and produce a solubility in the glass encapsulant tending to negate the chemical stability of the encapsulant produced by the refractory metal oxides.

To further assist in dissolving the refractory metals during smelting in the formation of the glass encapsulant, a fluxing agent of the nature of oxide compounds such as boron oxide, arsenic oxide, arsenic dioxide, bismuth oxide, magnesium oxide, and mixtures of these oxides is employed in the encapsulant. Because these oxide compounds do not have the drastic effect upon electrical properties of the glass encapsulant generally associated with the high fluxing agents, the oxide compounds generally can be tolerated in relatively higher percentages, e.g. between 2% and 6% by weight of the encapsulant. Preferably, the oxide compounds are present in the encapsulant in weight concentrations between 1 and 3-fold the total concentration of the high fluxing oxides. Lithium oxide and phosphorus compounds, e.g. phosphorus pentoxide, also can be substituted for a portion or all of one or more of the oxide compound fluxing agents, if desired.

To further control the thermal coefficient of expansion of the glass encapsulant, e.g. to reduce the thermal expansion of glass encapsulant to a value less than approximately $9 \times 10^{-6}''/'''/° C.$, a number of less active fluxing agents or flux modifiers, e.g. calcium oxide, barium oxide, zinc oxide, calcium fluoride, strontium oxide, and mixtures thereof, are incorporated into the encapsulant, e.g. by way of carbonates which decompose to the oxide during smelting. Because the flux modifiers generally are interchangeable, the weight percentage or presence of each flux modifier in the mixture is variable. The flux modifiers however desirably form from about 20% to 40% of the total weight of the glass encapsulant with the more active of the flux modifiers, such as calcium fluoride, being present in quantities below 8% by weight of the glass encapsulant.

As a result of the proportionality of the refractory metal oxides, the high fluxing agents, the oxide compounds and the flux modifiers, the glass encapsulant formed in accordance with this invention generally is characterized by a melting temperature between 750° and 850° and a thermal coefficient of expansion less than approximately $9 \times 10^{-5}''/'''/° C.$ In preparing a glass encapsulant in accordance with this invention for a capacitor formed by sequentially thick film screening a platinum/gold electrode, a Du Pont High K Capacitor Dielectric EP8229 and a gold platinum silver electrode upon an alumina substrate, the following formulation is mixed:

| Compound: | Percent by weight of mixture |
|---|---|
| $Na_2CO_3$ | 0.8–2.1 |
| $K_2CO_3$ | 1.2–2.4 |
| $CaCO_3$ | 4.8–11.5 |
| $BaCO_3$ | 4.9–16.3 |
| ZnO | 4.9–16.3 |
| CaF | 1.7–8.2 |
| $B_2O_3 \cdot 3H_2O$ | 3.3–13.1 |
| $Al_2O_3 \cdot 3H_2O$ | 8.2–14.7 |
| $SiO_2$ | 16.3–40.7 |
| CaO Stabilized $ZrO_2$ | 3.3–13.1 |

After a thorough mixing of the chosen materials, the mixture is smelted for a period of 1½ to 3 hours at a temperature of 1495–1500° C. in a platinum crucible positioned in a gas fired furnace. The carbon dioxide and water are released from the mixture compounds during smelting and a glass encapsulant is formed generally having the following composition:

| Compound: | Percent by weight |
|---|---|
| $Na_2O$ | 0.6–1.6 |
| $K_2O$ | 1.0–2.1 |
| CaO | 3.3–7.9 |
| BaO | 4.7–15.5 |
| ZnO | 6.1–20.5 |
| CaF | 2.1–9.7 |
| $B_2O_3$ | 1.5–7.0 |
| $Al_2O_3$ | 5.1–11.0 |
| $SiO_2$ | 20.0–50.0 |
| CaO Stabilized $ZrO_2$ | 4.05–16.1 |

A particularly preferred glass encapsulant is characterized by the following formulation:

| Compound: | Percent by weight |
|---|---|
| $Na_2O$ | 0.8 |
| $K_2O$ | 1.4 |
| CaO | 5.7 |
| BaO | 7.6 |
| ZnO | 15.3 |
| CaF | 3.8 |
| $B_2O_3$ | 5.4 |
| $Al_2O_3$ | 9.5 |
| $SiO_2$ | 37.9 |
| CaO Stabilized $ZrO_2$ | 12.5 |

The glass as smelted is not completely homogeneous and contains some undissolved refractory metal oxides because of the extremely high concentration of the refractory metal oxides relative to the fluxing materials in the mixture. Although the refractory metal oxides can be dissolved by increasing the temperatures of the smelting or by an increase in the weight percentage of fluxing materials, complete dissolution of the refractory metal oxides generally is not preferred because of the adverse electrical properties associated with increased weight percentages of the fluxing agents and the tendency of the mixture to volatilize with prolonged smelting at temperatures above 1500° C. After smelting for the required time, the melt is quenched rapidly under anhydrous conditions, e.g. by quenching on a steel plate, to inhibit crystallization during the formation of the glass for the encapsulant.

The glass then is ground to a dimension suitable for the mesh of the screen employed for printing, e.g. 2–3 microns for commonly employed 325–200 mesh screens. The period of the grinding generally is dependent upon the starting size of the glass and varies from approximately 3½ to 4½ hours. Prolonged grinding, e.g. over 8 hours, in a porcelain boule can produce contamination of the glass deleterious to the expansion properties and strength of the encapsulant formed therefrom and is to be avoided.

The ground glass then is mixed into a suitable vehicle to form a screenable ink for application atop the capacitor. Among the more commonly used vehicles are ethyl cellulose dissolved in pine oil with 8 grams of ethyl cellulose dissolved in 60 cc. of pine oil producing a viscosity suitable for printing with 325–200 mesh screens. The vehicle is mixed with the ground encapsulant glass in suitable proportions, e.g. approximately 2/1 by weight ground encapsulant glass to vehicle, for a period required to produce a smooth creamy, lump-free ink suitable for printing. The ink then is applied over the capacitor by screen printing and after setting at room temperature for a suitable period, e.g. 10 minutes, to dry, the coated capacitor is fired at 850° for 10 minutes to seal the glass encapsulant atop the capacitor. The coated capacitor then can be temperature cycled between 240° C. and −60° C. without adversely affecting the electrical characteristics of the capacitor when subsequently electrically energized while immersed in water.

A more complete understanding of the principles of this invention may be obtained from the following specific example:

A capacitor formed by sequentially screening a gold electrode, a Du Pont High K Capacitor Dielectric EP8229 and a gold counter electrode atop an alumina substrate was encapsulated utilizing a glass prepared from the following mixture:

| Compound: | Percent by weight |
|---|---|
| $Na_2CO_3$ | 1.2 |
| $K_2CO_3$ | 1.7 |
| $CaCO_3$ | 8.7 |
| $BaCO_3$ | 8.4 |
| $ZnO$ | 13.1 |
| $CaF$ | 3.3 |
| $B_2O_3 \cdot 3H_2O$ | 8.1 |
| $Al_2O_3 \cdot 3H_2O$ | 12.4 |
| $SiO_2$ | 32.4 |
| CaO Stabilized $ZrO_2$ | 10.6 |

The compounds forming the mixture were well intermingled and smelted in a platinum crucible over a period of 1⅓ hours at a temperature of approximately 1500° C. whereupon the melt was quenched employing a steel plate to prevent crystallization. The quenched glass then was ground to 2–3μ particles and mixed with a vehicle comprised of 8 grams of ethyl cellulose dissolved in 6 cc. of pine oil in a weight ratio of 28 grams glass to 15.7 grams vehicle. After thoroughly blending the mixture with a mortar and pestle, the ink was applied over the thick film capacitor by screen printing and dried for 10 minutes at room temperature. The coated capacitor then was baked at 100° C. for 10 minutes and fired at 850° for 10 minutes. Electrical testing of the capacitor indicated no variation in the capacitance of the dielectric film subsequent to the application of the encapsulant thereover. The capacitor thereupon was thermal cycled between 240° C. and −60° C. without crazing. The undamaged condition of the glass encapsulant upon temperature cycling occurs notwithstanding the fact that capacitor dielectric was of a composition containing less than approximately 12% by weight glass binder and exhibited a coefficient of expansion of approximately $10 \times 10^{-6}''/'''/°$ C. whie the alumina substrate and the metal electrodes were characterized by temperature coefficients of expansion of approximately $7.5 \times 10^{-6}''/'''/°$ C. and $13 \times 10^{-6}''/'''/°$ C., respectively.

Capacitors having palladium silver electrodes formed with a Squeegee Ink purchased from Engelhard Industries but otherwise identical to the capacitor of this specific example did exhibit a slight, e.g. 10%, lowering in capacitance resulting from encapsulation contrary to gold electroded capacitors of the example. This unusual result probably is caused by a diffusion of some glass through the palladium silver electrode to the dielectric-electrode interface. The decrease in the capacitance of palladium silver electroded capacitors upon encapsulation however generally is a constant value permitting the capacitance change to be factored into the formation of the capacitor dielectric when high tolerance capacitors having palladium silver electrodes are desired.

Although the glass encapsulant is described as being formed by the constituents in the above charts, it is to be realized that other equivalent materials can be employed to produce a similar weight percentage of the desired elements of the encapsulant mixture. For example, sodium zincate, i.e. $Na_2ZnO_3$, can be substituted for a portion or all of the sodium carbonate and zinc oxide of the encapsulant mixture to provide both the sodium oxide and the zinc oxide required for the glass encapsulant. The carbonates however generally are preferred because of the ability of the carbonate to decompose releasing carbon dioxide which assists in agitating the melt. Similarly zinc silicate, $ZnSiO_3$, can be substituted for the zinc oxide and some of the silicon dioxide of the glass encapsulant mixture.

What is claimed is:

1. A pre-fritted, translucent glass having a firing temperature less than 900° C. and a temperature co-efficient of expansion less than $9 \times 10^{-6}$ inch/inch/° C., consisting essentially of:

| Compound: | Percent by weight |
|---|---|
| $Na_2O$ | 0.6–1.6 |
| $K_2O$ | 1.0–2.1 |
| CaO | 3.3–7.9 |
| BaO | 4.7–15.5 |
| ZnO | 6.1–20.5 |
| $CaF_2$ | 2.1–9.7 |
| $B_2O_3$ | 1.5–7.0 |
| $Al_2O_3$ | 5.1–11.0 |
| $SiO_2$ | 20.0–50.0 |
| CaO Stabilized $ZrO_2$ | 4.05–16.1 |

2. A pre-fritted, translucent glass as set forth in claim 1 consisting essentially of:

| Compound: | Percent by weight |
|---|---|
| NaO | 0.8 |
| $K_2O$ | 1.4 |
| CaO | 5.7 |
| BaO | 7.6 |
| ZnO | 15.3 |
| $CaF_2$ | 3.8 |
| $B_2O_3$ | 5.4 |
| $Al_2O_3$ | 9.5 |
| $SiO_2$ | 37.9 |
| CaO Stabilized $ZrO_2$ | 12.5 |

References Cited
UNITED STATES PATENTS

| 3,210,204 | 10/1965 | Costain et al. | 106—48 |
| 2,324,812 | 7/1943 | Bahnsene et al. | 106—48 |
| 3,017,279 | 1/1962 | Van Dalah et al. | 106—48 |
| 3,457,183 | 7/1969 | Lee, Jr. et al. | 106—52 |

JAMES E. POER, Primary Examiner

M. L. BELL, Assistant Examiner

U.S. Cl. X.R.

106—48